US006043405A

United States Patent [19]

Honeycutt et al.

[11] Patent Number: 6,043,405

[45] Date of Patent: Mar. 28, 2000

[54] FORMULATION FOR NEUTRALIZATION OF FORMALDEHYDE AND METHOD OF USING AND DISPOSING OF THE SAME

[75] Inventors: Travis W. Honeycutt, Gainesville; Baosheng Lee, Duluth; Youshen Ding; Ashley Myers, both of Norcross; Dong Dai, Lawrenceville, all of Ga.

[73] Assignee: Isolyser Company, Inc., Norcross, Ga.

[21] Appl. No.: 08/990,380

[22] Filed: Dec. 15, 1997

[51] Int. Cl.[7] .......................... A62D 3/00; B01D 11/00; B01D 21/01; C08G 16/00

[52] U.S. Cl. .......................... 588/205; 588/215; 588/218; 588/238; 588/242; 210/633; 210/634; 210/702; 210/723; 210/729; 210/730; 210/731; 210/733; 210/734; 210/735; 210/749; 527/305; 527/300

[58] Field of Search .......................... 588/215, 218, 588/238, 242, 205; 210/728, 749, 702, 723, 633, 634, 729, 730, 731, 733, 734, 735; 527/305, 300; 528/243, 246, 230, 232

[56] References Cited

U.S. PATENT DOCUMENTS

| | | | |
|---|---|---|---|
| 3,752,781 | 8/1973 | Muzyczko et al. | 260/29.4 R |
| 4,454,254 | 6/1984 | Reichel et al. | 521/136 |
| 5,108,621 | 4/1992 | Robins | 210/728 |
| 5,317,071 | 5/1994 | Honeycutt | 527/305 |
| 5,352,368 | 10/1994 | Honeycutt | 210/749 |
| 5,554,718 | 9/1996 | Flory et al. | 528/246 |

FOREIGN PATENT DOCUMENTS

| | | | |
|---|---|---|---|
| 0 320 140 A1 | 6/1989 | European Pat. Off. | A62D 3/00 |

*Primary Examiner*—Steven P. Griffin
*Assistant Examiner*—Eileen E. Nave
*Attorney, Agent, or Firm*—Needle & Rosenburg, P.C.

[57] ABSTRACT

A method and treatment composition for neutralizing formaldehdye. The treatment composition contains polyethylenimine, urea and an acid having a pH of less than 6. Treatment of formaldehyde solutions with the treatment composition results in a suspension that it easily disposable and non-toxic.

23 Claims, No Drawings

FORMULATION FOR NEUTRALIZATION OF FORMALDEHYDE AND METHOD OF USING AND DISPOSING OF THE SAME

BACKGROUND OF THE INVENTION

1. Field of the Invention

The present invention relates to a method and composition suitable for the neutralization of formaldehyde and formaldehyde bearing solutions. The neutralization reaction yields an easily disposable reaction product in suspension by way of a substantially irreversible reaction.

2. Background of the Invention

The use of formaldehyde for medical and industrial applications is extensive. Formaldehyde is used by health care institutions for preserving tissue and by industry for various manufacturing processes including paper manufacture and plastics manufacture. Formaldehyde is also used in funeral home business for embalming and for disinfecting the surrounding work area. Formaldehyde, also referred to as "formalin" is sold to these institutions in a concentrated form (37 to 50% formaldehyde, 6 to 15% alcohol stabilizer, and water) and, in dilution, the most common concentration being 10% formalin or 3.75% formaldehyde.

Aidehydes, such as formaldehyde, are particularly useful because of their quick, effective kill of all pathenogenic organisms. Aldehydes, however are carcinogenic. Concerns for worker exposure and the environment have initiated the development of new handling, storage, and disposal regulations to limit worker and public exposure.

As concern for worker and environmental exposure increases, various methods, techniques and products have been sought to reduce the risk of exposure to formaldehyde.

It is an object of the present invention to provide a method of removing formaldehyde from solutions, with the residual material being substantially non-toxic so that it can then be safely and efficiently disposed of in municipal sewage systems and the like.

It is a further object of this invention that a reaction product in suspension be formed which may be easily disposed of. The reaction product in suspension is flushable in an ordinary sewer system without fear of toxicity to the surrounding environment.

DESCRIPTION OF THE RELATED ART

The reaction of urea with formaldehyde to form a copolymer and the resultant neutralization of formaldehyde is known. U.S. Pat. No. 5,108,621 discloses a method of neutralizing hazardous products in which formaldehyde bearing solutions are treated with a composition comprising urea and a product such as phosphoric acid or ammonium chloride. The reaction yields a solid product.

U.S. Pat. No. 5,317,071 discloses a method of converting an aldehyde to a non-toxic composition in which the aldehyde is reacted with one or more polymers having protic oxygen or nitrogen atoms and a polyimine to form a solid reaction product U.S. Pat. No. 5,352,368 discloses an aldehyde treatment system in which the ldehyde is reacted with resorcinol and a polyimine to form a liquid product.

Therefore, it would be highly desirable to provide a composition which forms an easily disposable reaction product in suspension, which may be easily disposed without fear of adverse consequences to the environment.

These and further object will be more readily appreciated when considering the following disclosure and appended claims.

SUMMARY OF THE INVENTION

The present invention involves a method of converting a solution which comprises formaldehyde to a product in suspension which is substantially non-toxic, and which may be easily disposed.

The present invention provides compositions and methods to convert a toxic composition containing formaldehyde to a non-toxic composition by way of a substantially irreversible reaction with a composition of the invention. The reaction product forms a suspension which may be easily disposed without an adverse effect on the environment.

In particular, the present invention provides a treatment composition comprising a urea, polyethylenimine, and an acid having a pH less than 6. In a preferred embodiment, the polyethylenimine comprises 0.5 to 15% by weight of the treatment composition, and the urea comprises 48% or less by weight of the treatment solution. The acid preferably has a pH of 2 to 3. In a further embodiment, the acid has a pH of 2.3.

In one embodiment, the acid used is a mineral acid. Suitable acids include, but are not limited to, hydrochloric acid, nitric acid, acetic acid, phosphoric acid, citric acid and oxalic acid. The present invention also provides a method of disposing of the reaction product after contact with the formaldehyde solution for a period of time sufficient to form a reaction product. The reaction proceeds at room temperature.

DETAILED DESCRIPTION OF THE INVENTION

The present invention may be understood more readily by reference to the following detailed description of preferred embodiments of the invention.

Before the present articles and methods are disclosed and described, it is to be understood that the terminology used herein is for the purpose of describing particular embodiments only and is not intended to be limiting. It must be noted that, as used in the specification and the appended claims, the singular forms "a", "an" and "the" include plural referents unless the context clearly dictates otherwise.

Throughout this application, where publication are references, the disclosures of these publication in their entireties are hereby incorporated by reference into this application in order to more fully describe the state of the art to which this invention pertains.

As previously noted, the present invention involves the reaction of formaldehyde or a solution containing formaldehyde to form a substantially non-toxic reaction product in suspension which is easily disposable. The reaction product is substantially non-toxic and may be disposed of without concern for adverse effects on the environment. It is contemplated that the formaldehyde be irreversibly reacted with a polyethylenimine, for example LUPASOL SC-86X, manufactured by BASF, in the presence of urea and an acid having a pH of less than 6 to form a reaction product in suspension which may be easily disposed.

While the reaction of urea with formaldehyde to form a urea-formaldehyde polymer is well known in the art, the addition of polyetheylernimine provides surprising and unexpectedly effective results.

Urea reacts with formaldehyde in the following manner:

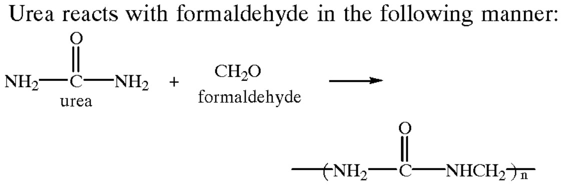

In the formulation of the present invention, the formaldehyde is reacted with a polyethylenimine in the presence of urea to form a stable reaction product, through an essentially irreversible reaction. In previous trials using only polyethylenimine, a soluble reaction product is formed, however, the reaction is reversible.

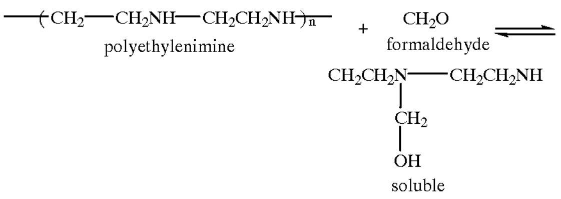

In the present invention, the formaldehyde is reacted with the polyethylenimnine in the presence of urea. The urea encapsulates the reaction product of the polyethylenimine and the formaldehyde, thereby forming a stable reaction product.

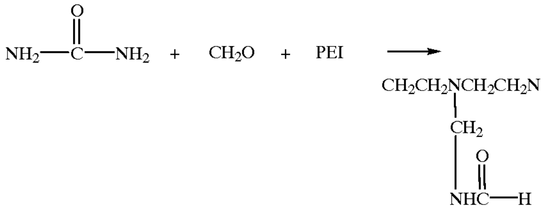

The reaction product formed is soluble and is present in suspension, and may be easily disposed of.

COMPARATIVE EXAMPLE

The most widely used composition in treating formaldehyde and formaldehyde bearing solutions, comprising urea and an acid, (FORMULEX) does not contain polyethylenimine. The reaction of this composition with formaldehyde yields a solid reaction product. A solid reaction product may not be as easily disposed of as a product in suspension. A solid product may result in clogged drains, for instance.

This composition (FORMULEX) was added to a 3.75% formaldehyde solution in a ratio of 1 part to 4 parts formaldehyde bearing solution. Table I sets forth concentration of residual formaldehyde versus treatment time.

TABLE I

Residual Formaldehyde in 10% Formalin Solution after Treatment by Using Formulex

| Times of Treatment (hours) | ppm | (%) |
|---|---|---|
| 0 | 37,500 | 100 |
| 4 (97101504) | 14,760 | ~40 |
| 4.5 (97102002) | 12,854 | ~34 |
| 7 (97102002) | 8,970 | ~25 |
| 9 (97102102) | 12,730 | ~34 |
| 14 (97102114) | 9,720 | ~26 |
| 16 (97102216) | 7,630 | ~20 |
| 20 (97101902) | 9,460 | ~25 |
| 21 (97102002) | 10,420 | ~28 |
| 24 (97102010) | 7,100 | ~19 |
| 24 (92102102) | 6,650 | ~18 |
| 28 (97102002) | 7,890 | ~21 |
| 38 (97102113) | 4,680 | ~12.5 |
| 45 (97102002) | 3,720 | ~10 |
| 48 (97101902) | 3,600 | ~9.5 |
| 48 (97102102) | 3,690 | ~10 |
| 50 (97101802) | 2,460 | ~6.5 |
| 68 (97101902) | 1,970 | ~5 |
| 70 (97102002) | 1,743 | ~4.5 |
| 72 (97101802) | 1,410 | ~4 |

The following Table shows the results of treatment of a formaldehyde bearing solution with a composition according to the invention.

EXAMPLE

A treatment composition according to the instant invention comprising 48% urea, 12% polyethylenimine and 2.5% hydrochloric acid (37% concentrated HCl) was added to a 3.75% formaldehyde solution in a ratio of 1 part treatment composition to 5 parts formaldehyde bearing solution. Table II sets forth concentration of residual formaldehyde versus treatment time.

TABLE II

Residual Formaldehyde in 10% Formalin Solution after Treatment

| Times of Treatment (hours) | ppm | (%) |
|---|---|---|
| 0 | 37,500 | 100 |
| 4 (97101504) | 7,650 | ~20 |
| 4.5 (97102002) | 6,000 | ~16 |
| 7 (97102002) | 4,850 | ~10 |
| 9 (97102102) | 3,720 | ~10 |
| 14 (97102114) | 3,000 | ~8 |
| 16 (97102216) | 2,900 | ~8 |
| 20 (97101902) | 2,153 | ~6 |
| 21 (97102002) | 2,140 | ~6 |
| 24 (97102010) | 1,635 | ~4.5 |
| 24 (92102102) | 1,930 | ~5 |
| 28 (97102002) | 960 | ~2.5 |
| 38 (97102113) | 630 | ~1.7 |
| 45 (97102002) | 530 | ~1.4 |
| 48 (97101902) | 350 | ~1.0 |
| 48 (97102102) | 420 | ~1.1 |
| 50 (97101802) | 450 | ~1.2 |
| 68 (97101902) | 460 | ~1.2 |
| 70 (97102002) | 680 | ~1.8 |
| 72 (97101802) | 470 | ~1.3 |

As is clear from the results shown in Tables I and II, the treatment composition of the instant invention removes formaldehyde from the treated solution at a substantially higher rate, and requires a substantially smaller amount of treatment solution. The reaction product is also in suspension, rather than solid, which aids in disposal of the waste product. The product is further substantially non-toxic and is flushable into a sewer system, without fear of an adverse effect on the environment.

It will be apparent to those skilled in the art that various modification and variations can be made in the present invention without departing form the scope or spirit of the invention. Other embodiments of the invention will be apparent to those skilled in the art from consideration of the specification and practice of the invention disclosed therein. It is intended that the specification and examples be considered as exemplary only, with the true scope and spirit of the invention being indicated by the following claims.

What is claimed is:

1. A method of neutralizing a solution comprising formaldehyde, the method comprising contacting the solution with a treatment composition comprising polyethylenimine, urea, and an acid, wherein the treatment composition substantially excludes formaldehyde.

2. The method of claim 1, wherein the acid has a pH of 2 to 3.

3. The method of claim 1, wherein the acid has a pH of 2.3.

4. The method of claim 1, wherein the acid is a mineral acid.

5. The method of claim 1, wherein the acid is hydrochloric acid, nitric acid, acetic acid, phosphoric acid, citric acid or oxalic acid.

6. The method of claim 1, wherein the acid is HCl.

7. The method of claim 1, wherein the solution is a 3.75% by weight formaldehyde in water solution and wherein the ratio of the treatment composition to the solution is at least 1:5.

8. The method of claim 1, wherein the polyethylenimine comprises 0.5 to 15% by weight of the treatment composition, and the urea comprises 48% or less by weight of the treatment composition.

9. A composition for neutralizing formaldehyde, comprising polyethylenimine, urea and an acid, wherein the composition substantially excludes formaldehyde.

10. The composition of claim 9, wherein polyethylenimine comprises 0.5 to 15% by weight of the composition, and the urea comprises 48% by weight or less of the composition.

11. The composition of claim 9, wherein the acid has a pH of 2 to 3.

12. The composition of claim 9, wherein the acid has a pH of 2.3.

13. The composition of claim 9, wherein the acid is a mineral acid.

14. The composition of claim 9, wherein the acid is hydrochloric acid, nitric acid, phosphoric acid, citric acid or oxalic acid.

15. The composition of claim 9, wherein the acid is HCl.

16. A method of disposing of a solution comprising formaldehyde, the method comprising:

a) contacting the solution with a treatment composition which comprises, before contacting with the solution, polyethylenimine, urea and an acid, wherein the treatment composition substantially excludes formaldehyde, b) forming a reaction product suspension, and c) disposing of the reaction product suspension.

17. The method of claim 16, wherein the acid has a pH of 2 to 3.

18. The method of claim 16, wherein the acid has a pH of 2.3.

19. The method of claim 16, wherein the acid is a mineral acid.

20. The method of claim 16, wherein the acid is hydrochloric acid, nitric acid, acetic acid, phosphoric acid, citric acid or oxalic acid.

21. The method of claim 16, wherein the acid is HCl.

22. The method of claim 16, wherein the polyethylenimine comprises from 0.5 to 15% by weight of the composition and urea comprises 48% or less by weight of the composition.

23. The method of claim 16, wherein the solution is a 3.75% by weight formaldehyde in water solution, and the ratio of the composition to the formaldehyde solution is at least 1:5.

* * * * *